United States Patent
Reaves et al.

(10) Patent No.: US 9,539,585 B2
(45) Date of Patent: *Jan. 10, 2017

(12)

(54) MAGNETIC SEPARATOR WITH DYNAMIC BAFFLE SYSTEM

(71) Applicant: WHEELABRATOR GROUP, INC., Golden, CO (US)

(72) Inventors: Michael Dwayne Reaves, Pine Mountain, GA (US); David W. Howard, La Grange, GA (US)

(73) Assignee: WHEELABRATOR GROUP, INC., Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,862

(22) Filed: Jun. 14, 2016

(65) Prior Publication Data

US 2016/0288293 A1    Oct. 6, 2016

Related U.S. Application Data

(60) Continuation of application No. 15/006,401, filed on Jan. 26, 2016, now Pat. No. 9,370,781, which is a division of application No. 13/754,273, filed on Jan. 30, 2013, now Pat. No. 9,242,251.

(51) Int. Cl.
| | |
|---|---|
| *B03C 1/14* | (2006.01) |
| *B03C 1/30* | (2006.01) |
| *B07B 1/22* | (2006.01) |
| *B24C 9/00* | (2006.01) |

(52) U.S. Cl.
CPC . *B03C 1/30* (2013.01); *B03C 1/14* (2013.01); *B03C 2201/20* (2013.01); *B07B 1/22* (2013.01); *B24C 9/006* (2013.01)

(58) Field of Classification Search
CPC ............... B03C 1/10; B03C 1/12; B03C 1/14; B03C 1/30; B03C 2201/20; B01D 21/0009; B01D 21/0024; B01D 21/0042; B01D 21/0087; B01D 21/302; B01D 21/34; B01D 35/06; B24C 9/006; B07B 1/18; B07B 1/22

See application file for complete search history.

(56) References Cited

U.S. PATENT DOCUMENTS

| | | |
|---|---|---|
| 1,729,008 A | 9/1929 | Osborne et al. |
| 1,948,080 A | 2/1934 | Thomas |
| 2,188,516 A | 1/1940 | Payne |
| 2,564,515 A | 8/1951 | Vogel |
| 2,645,348 A | 7/1953 | Hoff |
| 2,696,301 A | 12/1954 | Mojden et al. |
| 2,939,580 A | 6/1960 | Carpenter |

(Continued)

*Primary Examiner* — David C Mellon
(74) *Attorney, Agent, or Firm* — Lando & Anastasi, LLP

(57) ABSTRACT

A dynamic baffle system for a magnetic separator includes a containment barrier secured to a frame and positioned between a rotary screen drum and a magnetic drum. The dynamic baffle system further includes a baffle configured to block an opening of the containment barrier. The baffle is movable between an open position in which media mixture is capable of flowing from the containment barrier to the magnetic drum and a closed position in which the media mixture is prohibited from flowing from the containment barrier to the magnetic drum and configured to evenly build up on the containment barrier. The dynamic baffle system further includes a sensor and a controller coupled to the sensor and the baffle to control the amount of media mixture flowing from the rotary screen drum to the magnetic drum.

20 Claims, 10 Drawing Sheets

(56) References Cited

U.S. PATENT DOCUMENTS

| | | |
|---|---|---|
| 3,005,547 A | 10/1961 | Freeman |
| 3,327,852 A | 6/1967 | Mortsell |
| 3,368,677 A | 2/1968 | Bradley, Jr. |
| 3,456,797 A | 7/1969 | Marriott |
| 3,522,883 A | 8/1970 | Steckhan |
| 3,684,090 A | 8/1972 | Kilbride |
| 3,934,374 A | 1/1976 | Leliaert |
| 4,017,384 A | 4/1977 | Freeman et al. |
| 4,080,760 A | 3/1978 | Leliaert |
| 4,166,788 A | 9/1979 | Druz et al. |
| 4,293,410 A | 10/1981 | Streuli et al. |
| 4,476,655 A | 10/1984 | Ansbaugh |
| 4,723,379 A | 2/1988 | Macmillan et al. |
| 4,907,379 A | 3/1990 | MacMillan |
| 4,908,998 A | 3/1990 | Watkin et al. |
| 5,417,608 A | 5/1995 | Elliott |
| 5,423,715 A | 6/1995 | Schloetzer |
| 5,476,412 A | 12/1995 | Stoltz |
| 5,590,467 A | 1/1997 | Schloetzer |
| 5,759,091 A | 6/1998 | MacMillan |
| 5,839,945 A | 11/1998 | Elliott |
| 6,062,956 A | 5/2000 | Elliott |
| 6,126,516 A | 10/2000 | Barrier et al. |
| 6,764,390 B2 | 7/2004 | Holloway et al. |
| 6,949,014 B2 | 9/2005 | Barrier et al. |
| 7,357,260 B2 | 4/2008 | Kaeske |
| 8,403,128 B2 | 3/2013 | Farrell et al. |
| 8,561,786 B2 | 10/2013 | Farrell et al. |
| 8,620,033 B2 | 12/2013 | Bitzel, Jr. et al. |
| 9,242,251 B2 | 1/2016 | Reaves et al. |
| 9,370,781 B2 | 6/2016 | Reaves et al. |
| 2013/0240413 A1 | 9/2013 | Keaton et al. |

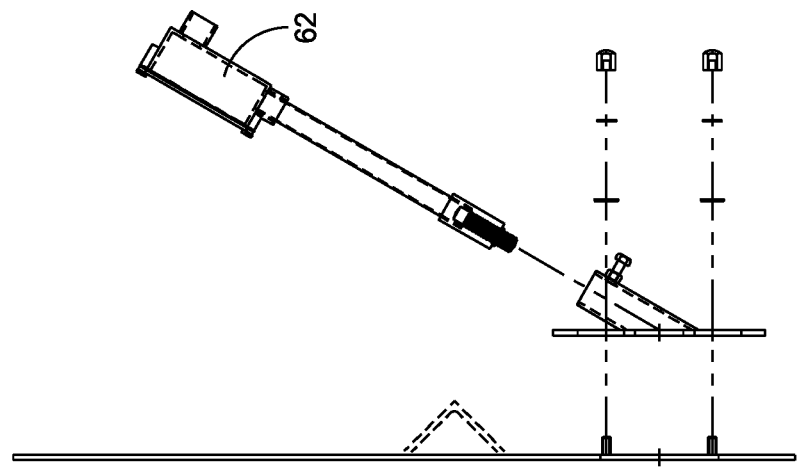
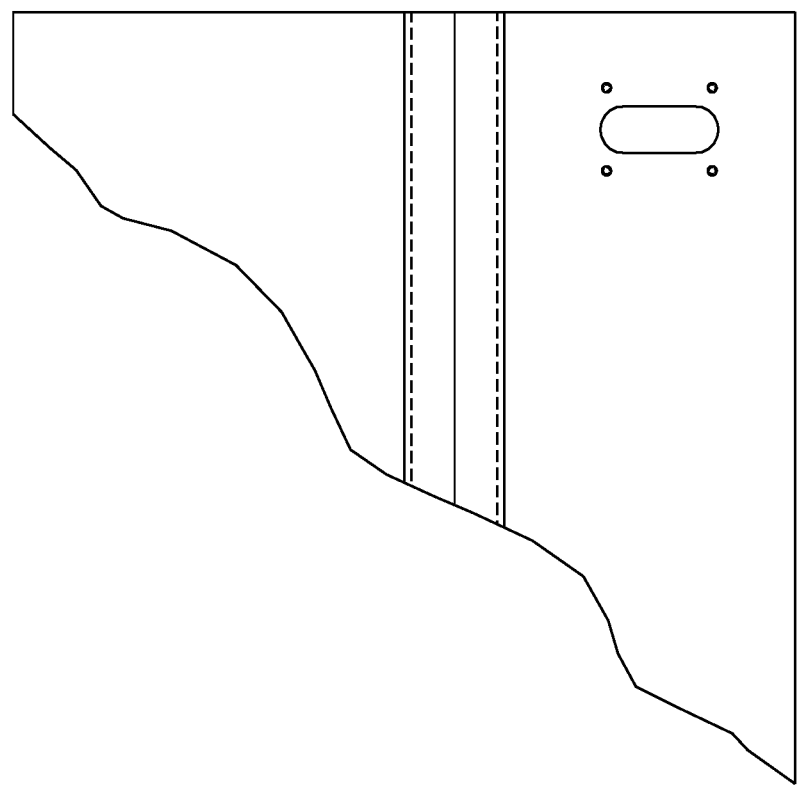
FIG. 6

MAGNETIC SEPARATOR WITH DYNAMIC BAFFLE SYSTEM

CROSS-REFERENCE TO RELATED APPLICATIONS

This application is a Continuation Application of U.S. application Ser. No. 15/006,401 filed Jan. 26, 2016, titled MAGNETIC SEPARATOR WITH DYNAMIC BAFFLE SYSTEM, which is a Divisional Application of U.S. application Ser. No. 13/754,273, filed Jan. 30, 2013, titled MAGNETIC SEPARATOR WITH DYNAMIC BAFFLE SYSTEM, now U.S. Pat. No. 9,442,251, both of which are hereby incorporated herein by reference in its entirety.

BACKGROUND OF THE DISCLOSURE

1. Field of the Disclosure

This disclosure relates generally to the field of media recovery systems for surface preparation equipment, such as shot blast equipment, and more particularly to an improved magnetic separator to improve the efficiency of separation of abrasive media from molding sand and metallic fines.

2. Discussion of Related Art

Media recovery systems are used to return media, such as shot, grit, sand, and the like, to surface preparation equipment, such as shot blast equipment. A typical recovery system may include a magnetic separator that operates intermittently, resulting in varying amounts of abrasive media flow to the magnetic separator. The inconsistent use of the magnetic separator has posed a problem in its operation. Specifically, the flow of media over a magnetic drum of the magnetic separator can be observed to advance and retreat across a face of the magnetic drum, which can be 60 to 72 inches long. This inconsistent application of media results in uneven burdening of the media on the drum, and less efficient cleaning. Similarly, as the media is conveyed to a lower chamber of the magnetic separator, the media mixture is not fully distributed along a length of the separator. In some cases, the inability to evenly distribute the media can also lead to an unbalanced distribution along the length of the magnetic separator. In some cases, this can also lead to unbalanced distribution of media mixture to a shot wheel by way of an abrasive hopper, which can be designed to depend on an evenly distributed loading of abrasive media along the full length of the separator.

SUMMARY OF THE DISCLOSURE

A dynamic baffle system is fitted to a magnetic separator between a rotary screen chamber and a magnetic drum. The dynamic baffle system serves to spread abrasive/sand media mixture across a full length of the drum by closing off a flow of mixture when a full load of media mixture is not sensed. This spreading of mixture is accomplished in part by positioning a sensor at an exit end of the magnetic separator, with the sensor acting to close off the baffle when there is no media mixture present. An outer flighting of the rotary screen acts to push media mixture toward the exit end as it piles up, and the dynamic baffle system acts to provide a full abrasive/sand media mixture or none at all, until enough mixture builds up to provide a full load.

The dynamic baffle system of embodiments of the present disclosure provides an evenly distributed flow of abrasive/sand media mixture along a full length of the magnetic drum of the magnetic separator to improve the efficiency of separation of the abrasive/sand media from molding sand and metallic fines. The dynamic baffle system provides a more efficient cleaning of abrasive resulting in an increase in life of blast wheel components, and more importantly, an increased cleaning efficiency of products within the shot blast equipment since the steel abrasive cleans products more efficiently than molding sand.

One aspect of the present disclosure is directed to a dynamic baffle system for a magnetic separator of the type including a frame, a rotary screen drum secured to the frame and configured to receive abrasive/sand media mixture, and a magnetic drum secured to the frame and positioned below the rotary screen drum. In one embodiment, the dynamic baffle system includes at least one containment barrier secured to the frame and positioned between the rotary screen drum and the magnetic drum. The at least one containment barrier has an opening formed therein. The dynamic baffle system further includes a baffle configured to block the opening of the at least one containment barrier. The baffle is movable between an open position in which media mixture is capable of flowing from the at least one containment barrier to the magnetic drum and a closed position in which the media mixture is prohibited from flowing from the at least one containment barrier to the magnetic drum and configured to evenly build up on the at least one containment barrier. The dynamic baffle system further includes a sensor configured to detect the presence of media within the at least one containment barrier and a controller coupled to the sensor and the baffle to control the amount of media mixture flowing from the rotary screen drum to the magnetic drum via the at least one containment barrier.

Embodiments of the dynamic baffle system may be directed to configuring the at least one containment barrier to include a first sloping wall positioned on one side of the rotary screen drum and a second sloping wall positioned on an opposite side of the rotary screen drum. The at least one containment barrier further may include a horizontal wall extending from one of the first sloping wall and the second sloping wall. The opening is defined between the horizontal wall and the other of the first sloping wall and the second sloping wall. The dynamic baffle system further may include a shaft configured to rotate the baffle between its open and closed positions and a stop secured to the frame and configured to limit the motion of the baffle when moving to its open position. The dynamic baffle system may also be alternatively configured to rotate to a free swinging open position. The dynamic baffle system further may include a burden plate secured to the frame and positioned adjacent the opening and configured to guide media mixture around the magnetic drum. In one embodiment, the sensor is a capacitive proximity switch. The controller may be configured to control the movement of the baffle to the open position when the at least one containment barrier is completely full with media mixture, and to control the movement of the baffle to the closed position when media mixture contained within the at least one containment barrier retreats from an exit end of the magnetic separator to enable an outer flighting of the rotary screen drum to push the media mixture to the exit end of the magnetic separator thereby resulting in a full distribution of abrasive across a face of the magnetic drum. A timer may be coupled to the controller to mitigate responses near a set point to avoid chattering of the baffle.

Another aspect of the present disclosure is directed to a magnetic separator includes a frame, a rotary screen drum secured to the frame and configured to receive abrasive/sand media mixture, a magnetic drum secured to the frame and positioned below the rotary screen drum, and at least one containment barrier secured to the frame and positioned between the rotary screen drum and the magnetic drum, the at least one containment barrier having an opening formed therein. In one embodiment, the dynamic baffle system includes a baffle configured to block the opening of the at least one containment barrier. The baffle is movable between an open position in which media mixture is capable of flowing from the at least one containment barrier to the magnetic drum and a closed position in which the media mixture is prohibited from flowing from the at least one containment barrier to the magnetic drum and configured to evenly build up on the at least one containment barrier. The dynamic baffle system further includes a sensor configured to detect the presence of media with the at least one containment barrier and a controller coupled to the sensor and the baffle to control the amount of media mixture flowing from the rotary screen drum to the magnetic drum via the at least one containment barrier.

Another aspect of the disclosure is directed to a method of controlling the flow of abrasive/sand media mixture within a magnetic separator. In one embodiment, the method comprises: transferring media mixture from a rotary screen drum to at least one containment barrier positioned below the rotary screen drum, the at least one containment barrier having an opening formed therein; sensing the presence of media mixture within the at least one containment barrier; and controlling the movement of a baffle between an open position in which media mixture is capable of flowing from the at least one containment barrier to the magnetic drum and a closed position in which the media mixture is prohibited from flowing from the at least one containment barrier to the magnetic drum and configured to evenly build up on the at least one containment barrier.

One embodiment of the method includes controlling the movement of the baffle to the open position when the at least one containment barrier is completely full with media mixture, and controlling the movement of the baffle to the closed position when media mixture contained within the at least one containment barrier retreats from an exit end of the magnetic separator to enable an outer flighting of the rotary screen drum to push the media mixture to the exit end of the magnetic separator thereby resulting in a full distribution of abrasive across a face of the magnetic drum.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 6 is an enlarged detail view taken from FIG. 4;

DETAILED DESCRIPTION

Figure 1:
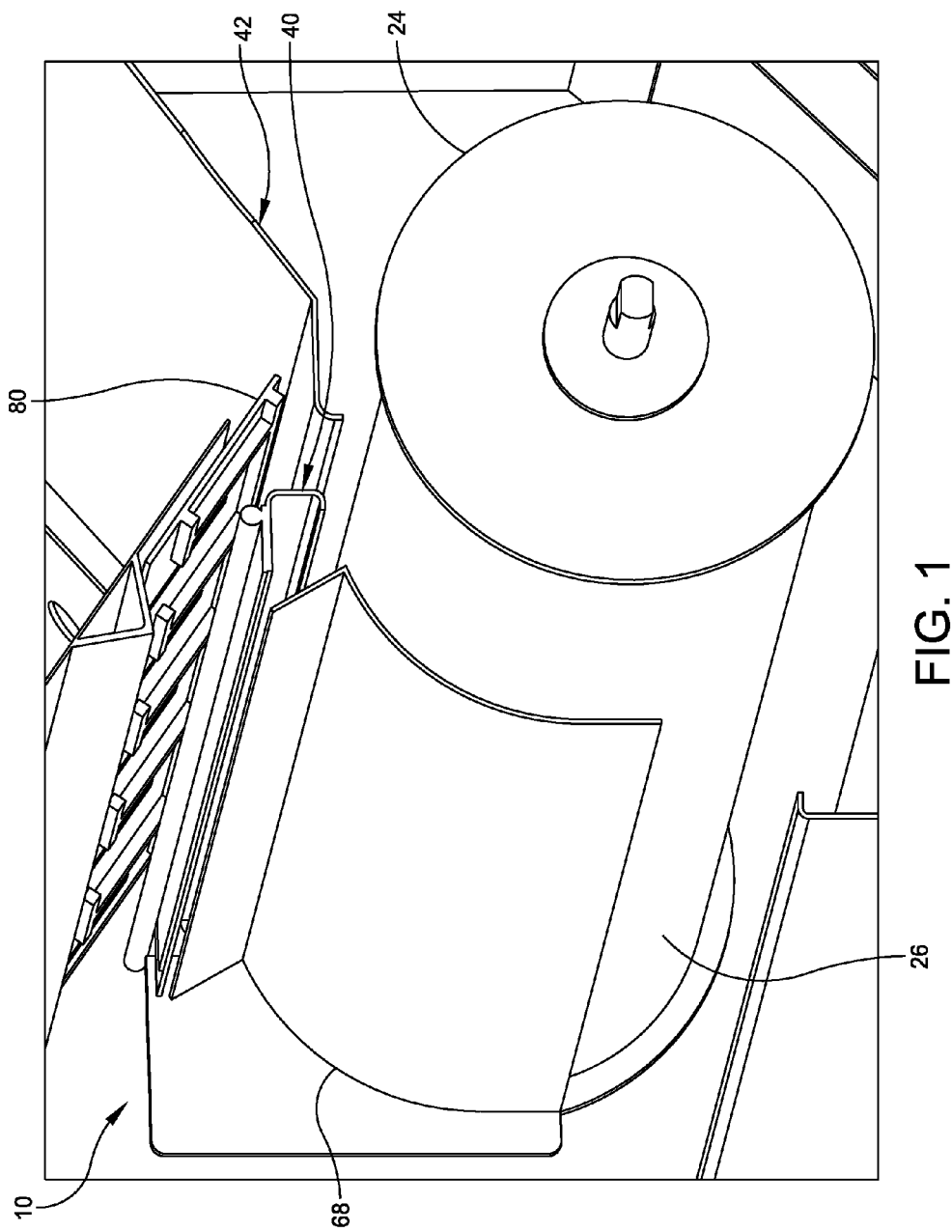
FIG. 1 is a perspective view of a magnetic separator of an embodiment of the present disclosure.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Embodiments of the disclosure are directed to a magnetic separator having a dynamic baffle assembly that includes a sensor to signal the presence or absence of abrasive/sand media mixture at an exit end of the magnetic separator. The sensor indicates whether a full loading of abrasive/sand mixture is present to form a uniform loading across a full length of a rotary magnetic drum of the magnetic separator. When a full load is indicated, an actuator releases a swinging or rotary baffle to allow the baffle to act as a standard compensating baffle. When the abrasive/sand media mixture retreats from the exit end of the magnetic separator, the actuator pushes the baffle closed, thus allowing an outer flighting of the rotary screen to push the abrasive/sand media mixture load to the exit end, resulting in a full distribution of abrasive across a face of the magnetic drum. During steady state operation, it might be expected that the abrasive/sand media mixture would back away from the end of the magnetic separator at approximately the same interval as an intermittent operation of the blast wheels. To this end, a timer is used within the system to mitigate responses near the set point to avoid chattering of the baffle.

A loading of the abrasive/sand media mixture is directed across the face of the magnetic drum and kept in close proximity to the magnets by a burden plate that conforms to the shape of the magnetic drum. The abrasive/sand media mixture is dropped out into a separator compartment and the steel abrasive is conveyed into a hopper by way of a secondary air wash cleaning and on to the blast wheel. The process of operation of separating magnetic materials from the abrasive/sand media mixture following the dynamic baffle system is typical among standard magnetic separators.

The sensor may consist of capacitive proximity switches, a differential air pressure sensor, or a vibrating type sensor. All of these sensing elements serve to sense the presence or absence of abrasive/sand media mixture, and trigger opening or closing of the dynamic baffle system.

Figure 2:
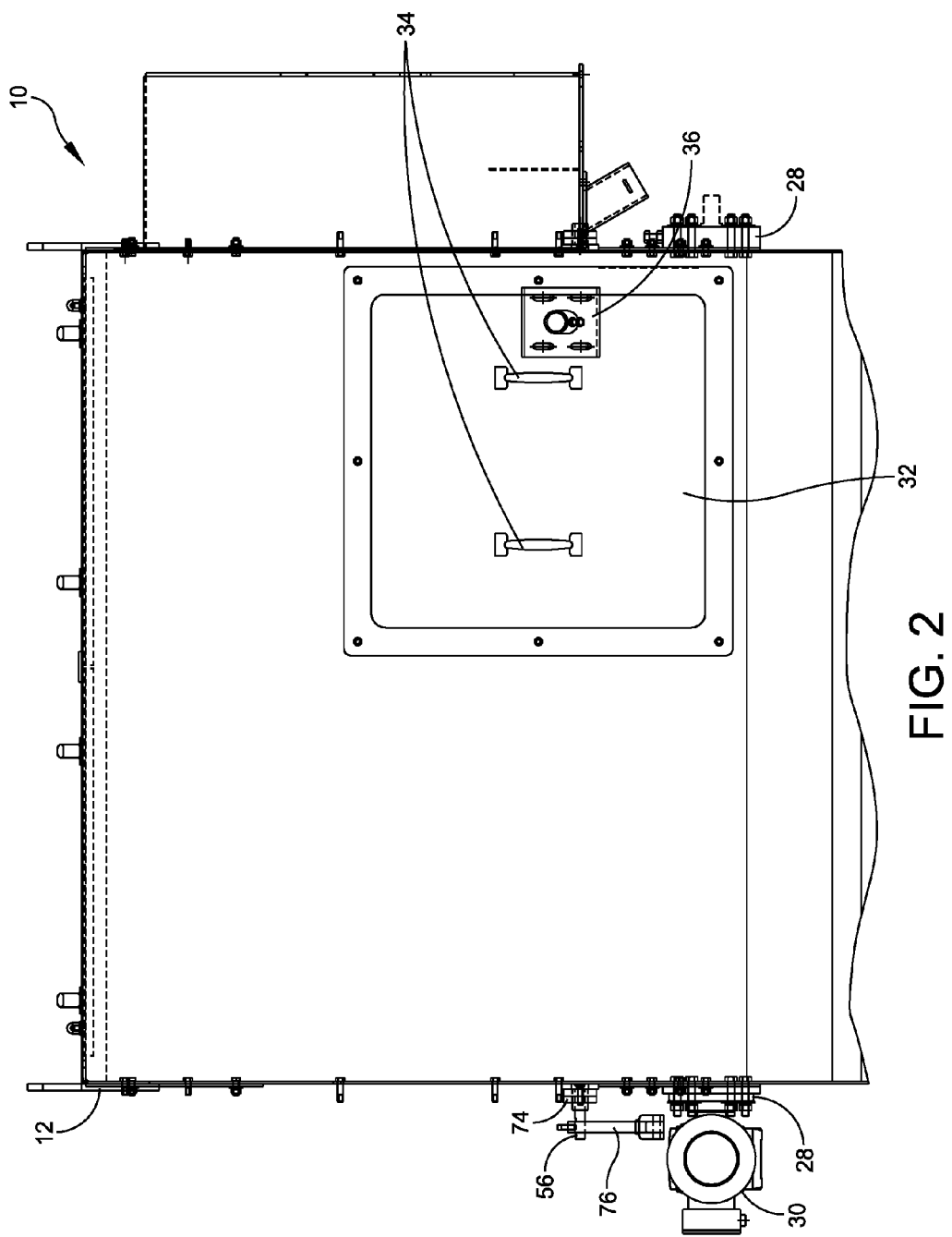
FIG. 2 is a front elevational view of the magnetic separator shown in FIG. 1.
Figure 3:
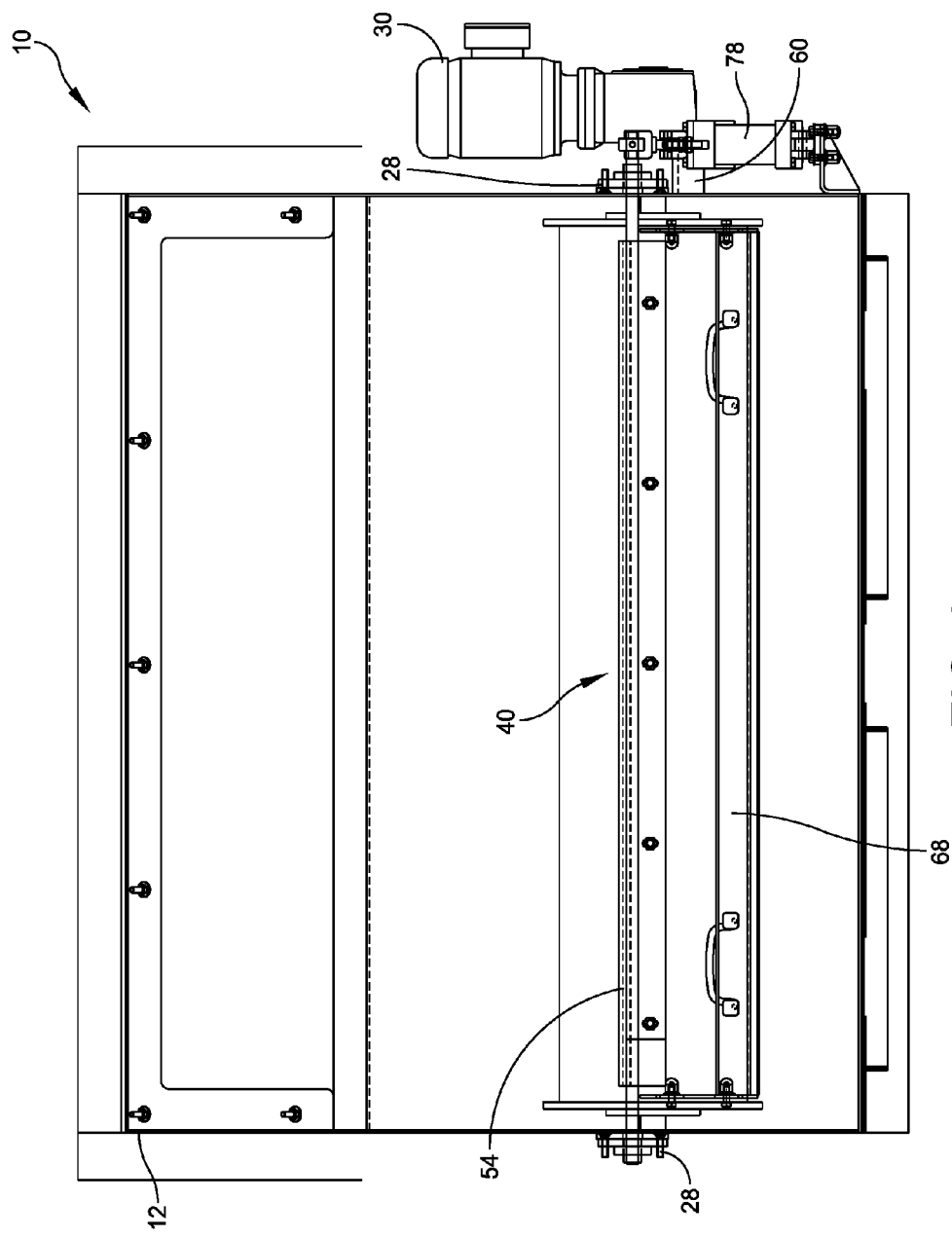
FIG. 3 is a rear elevational view of the magnetic separator with outer panels removed to reveal working components of the magnetic separator including a dynamic baffle system.

Referring now to the drawings, a portion of a magnetic separator is generally indicated at 10. As shown, the magnetic separator 10 includes a frame 12 (FIG. 2) fabricated from structural steel or the like to support the working components of the magnetic separator. The magnetic separator 10 further includes a rotary screen drum 14 that is secured to the frame 12 and configured to receive and deliver abrasive/sand media mixture, hereinafter referred to as "media mixture." As used herein, media mixture shall include any abrasive material, such as steel shot used in surface preparation, including shot blast, equipment. The rotary screen drum 14 includes a large diameter central portion 16 and reduced diameter end portions, which are received within rotary bearings secured to the frame 12. A suitable drive mechanism, including a motor, is provided to drive the rotation of the rotary screen drum 14. The central portion 16 of the rotary screen drum 14 includes a flighting 22 that is configured to separate and evenly distribute media mixture that is fed to the rotary screen drum across a width of the rotary screen drum. The flighting 22 serves as a rotary screw to move media mixture from one end of the rotary screen drum 14 to the other end of the rotary screen drum. In one embodiment, the drive mechanism may be located at an end of a screw conveyor trough, which is positioned on an entrance end of the magnetic separator. Positioned below the rotary screen drum 14 is a magnetic drum 24 that is secured to the frame 12 and configured to attract magnet material within the media mixture. As with the rotary screen drum 14, the magnetic drum 24 includes a large diameter central portion 26 and reduced diameter end portions, which are received within a rotary bearing on the drive end 28 (FIGS. 2-5) and a rigid mount on the tail end, secured to the frame 12. A drive mechanism 30 is provided to drive the rotation of the magnetic drum 24.

Figure 1A:
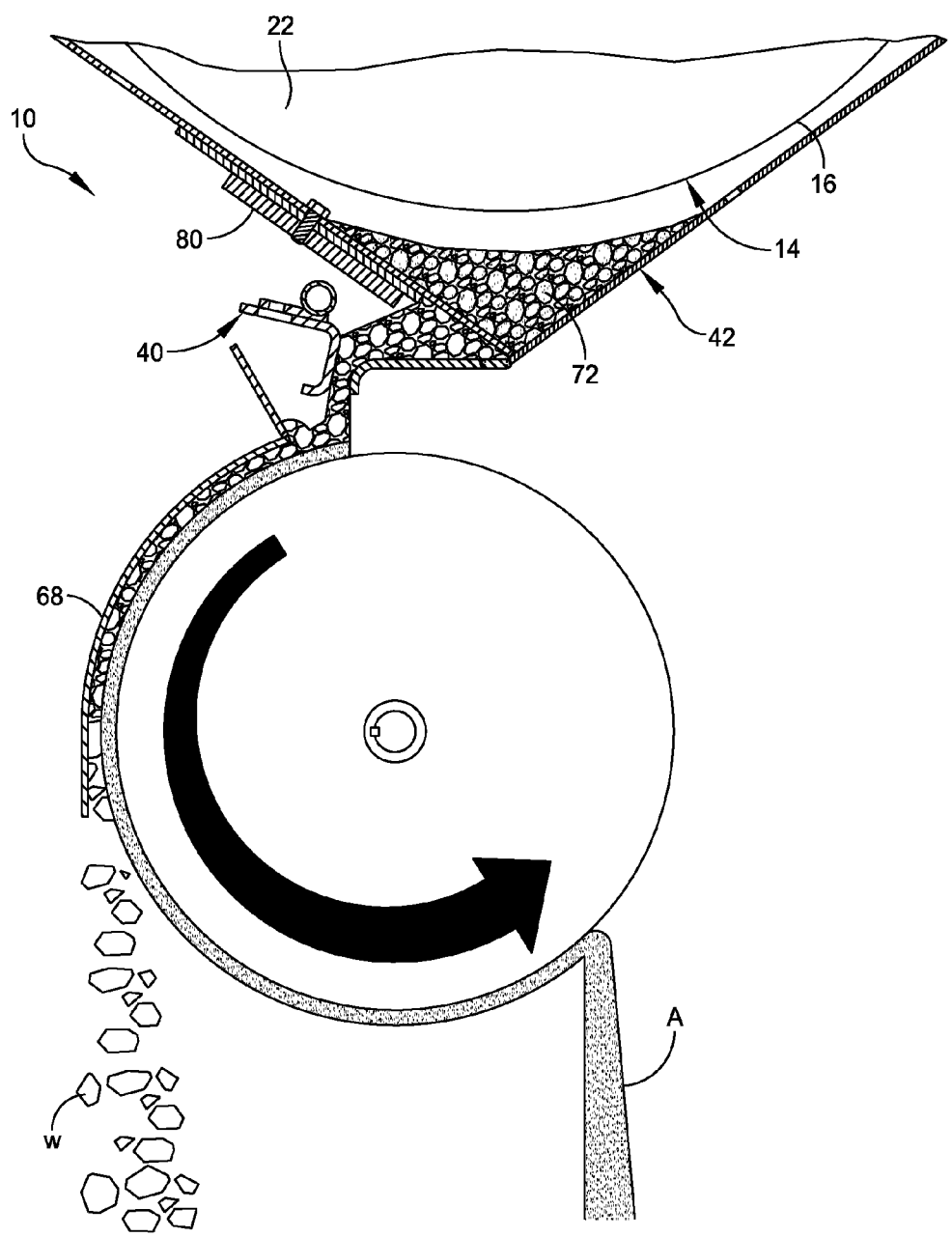
FIG. 1A is a cross-sectional view of the magnetic separator shown in FIG. 1.

In one embodiment, the platform of the magnetic separator 10 described thus far may be a low-profile separator offered by WHEELABRATOR®, which features a magnetic separation system incorporated into an air-wash separator. The magnetic separator 10 is designed to magnetically separate abrasive media (either steel shot or grit) from sand or ferrous from non-ferrous media material by the rotating magnetic drum 24 followed by the removal of fine waste material by an air-wash system. Magnetic separators, such as magnetic separator 10, may be used in select applications for the automotive, aerospace, construction, foundry, pipeline and petroleum industries. The magnetic separator 10 is configured to remove sand from the steel shot even under extremely heavy sand loads. The magnetic separator 10 increases the overall wear life of certain blast equipment component parts. This is because abrasive/sand media mixture significantly increases the wear on blast equipment component parts. Sand and abrasive (metallic) discharges from the elevator of a blast machine into an upper screw, which feeds the media mixture to the rotary screen drum 14 of the magnetic separator 10 where trash and other oversized particles are removed. The media mixture passes through the rotary screen drum 14 where it is metered onto the top of the magnetic drum 24. The ferrous media mixture is held against the magnetic drum 24 to be released at a proper location while the non-ferrous media mixture is allowed to flow directly into a discharge hopper to a disposable container or transporter for reuse. The released ferrous abrasive mixture is directed to the air-wash system for removal of fines and reuse of the clean abrasive. This process is illustrated in FIG. 1A, which shows waste material W being separated from abrasive/sand media mixture A.

Access to the interior of magnetic separator 10 may be provided through a removable access cover 32 (FIG. 2) provided on a front of the magnetic separator. As shown, the access cover 32 includes a pair of handles, each indicated at 34, to enable an operator to remove the access cover. The access cover 32 further includes a mounting bracket 36, the purpose of which will be described as the description of the disclosure proceeds.

Referring now to FIGS. 2-9, a dynamic baffle system, generally indicated at 40, of the present disclosure is shown and described as follows. The dynamic baffle system 40 includes a containment barrier structure generally indicated at 42 that is secured to the frame 12 of the magnetic separator 10. As shown, the containment barrier structure 42 is positioned between the rotary screen drum 14 and the magnetic drum 24 to capture media mixture deposited from the rotary screen drum. The containment barrier structure 42 includes a first sloping wall 44 positioned on one side of the rotary screen drum 14 and a second sloping wall 46 positioned on an opposite side of the rotary screen drum. The containment barrier structure 42 further includes a horizontal wall 48 that extends from the first sloping wall 44. The component parts of the containment barrier structure 42, including the first sloping wall 44, the second sloping wall 46, and the horizontal wall 48, are each secured to the frame of the magnetic separator in a suitable manner. In one embodiment, the containment barrier structure 42 may be fabricated from sheet metal material.

Figure 8:
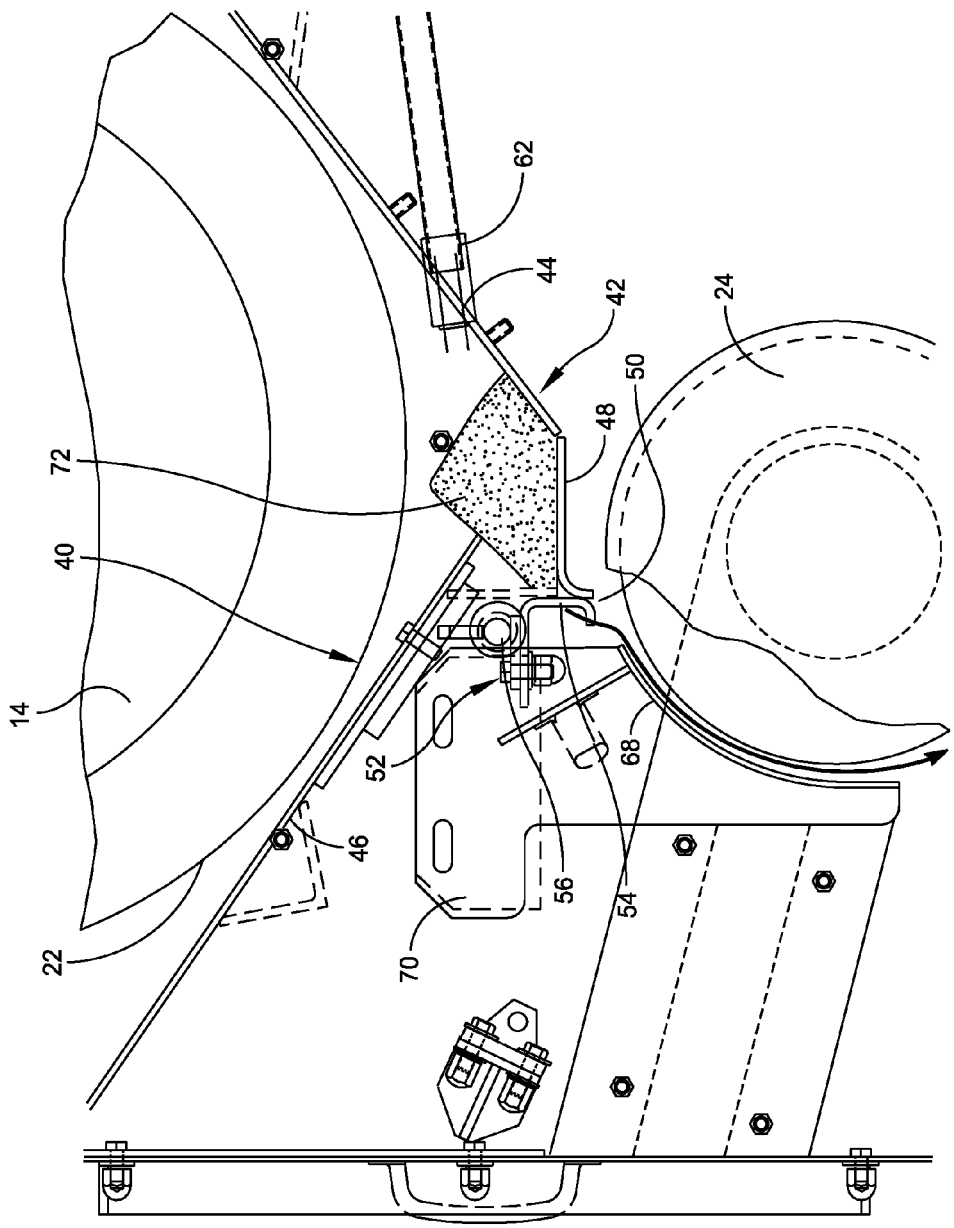
FIG. 8 is an enlarged cross-sectional view of the dynamic baffle system.

As best shown in FIG. 8, a space or opening 50 between an edge of the second sloping wall 46 and an edge of the horizontal wall 48 defines an opening through which abrasive/sand media material exits from the rotary screen drum 14 to the magnetic drum 24. To contain and release material within the containment barrier structure 42, the dynamic baffle system 40 includes a baffle system, generally indicated at 52, which is configured to selectively block the opening 50 of the containment barrier structure. The baffle system 52, or simply baffle, includes a baffle plate 54, which may be fabricated from metallic material formed as a right-angle, and a shaft 56 secured to the baffle plate and then rotatably secured to the frame 12 of the magnetic separator 10. Specifically, the baffle plate 54 is configured to move between an open position in which media mixture is capable of flowing from the containment barrier structure 42 to the magnetic drum 24, and a closed position in which the baffle plate engages the edge of the horizontal wall 48 and the media mixture is prohibited from flowing from the containment barrier structure to the magnetic drum. When closed, the media mixture piles up within the containment barrier structure 42 with the flighting 22 of the rotary screen drum 14 distributing media mixture evenly within the containment barrier structure 42.

Figure 4:
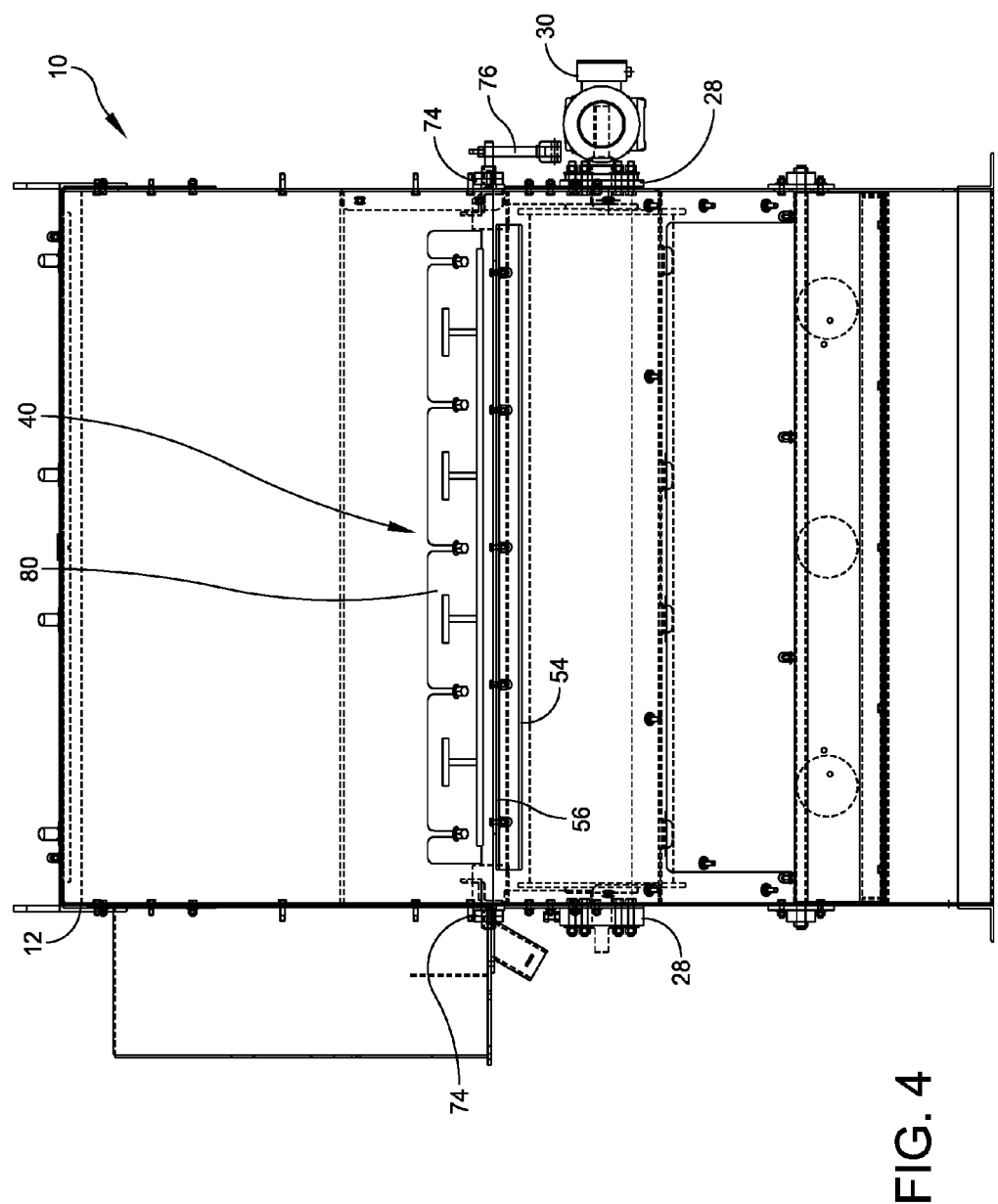
FIG. 4 is a top plan view thereof.
Figure 5:
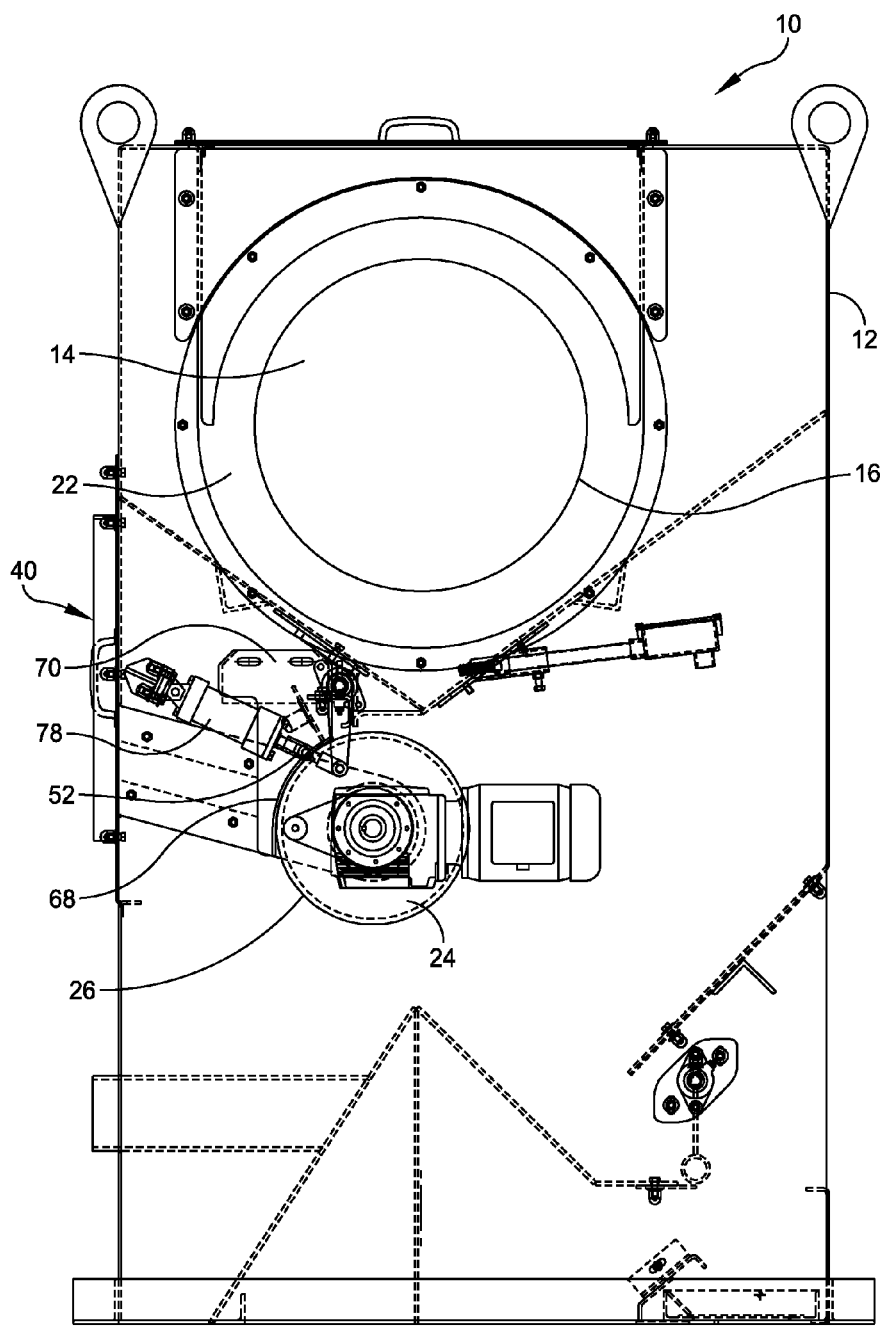
FIG. 5 is a side elevational view thereof.
Figure 7:
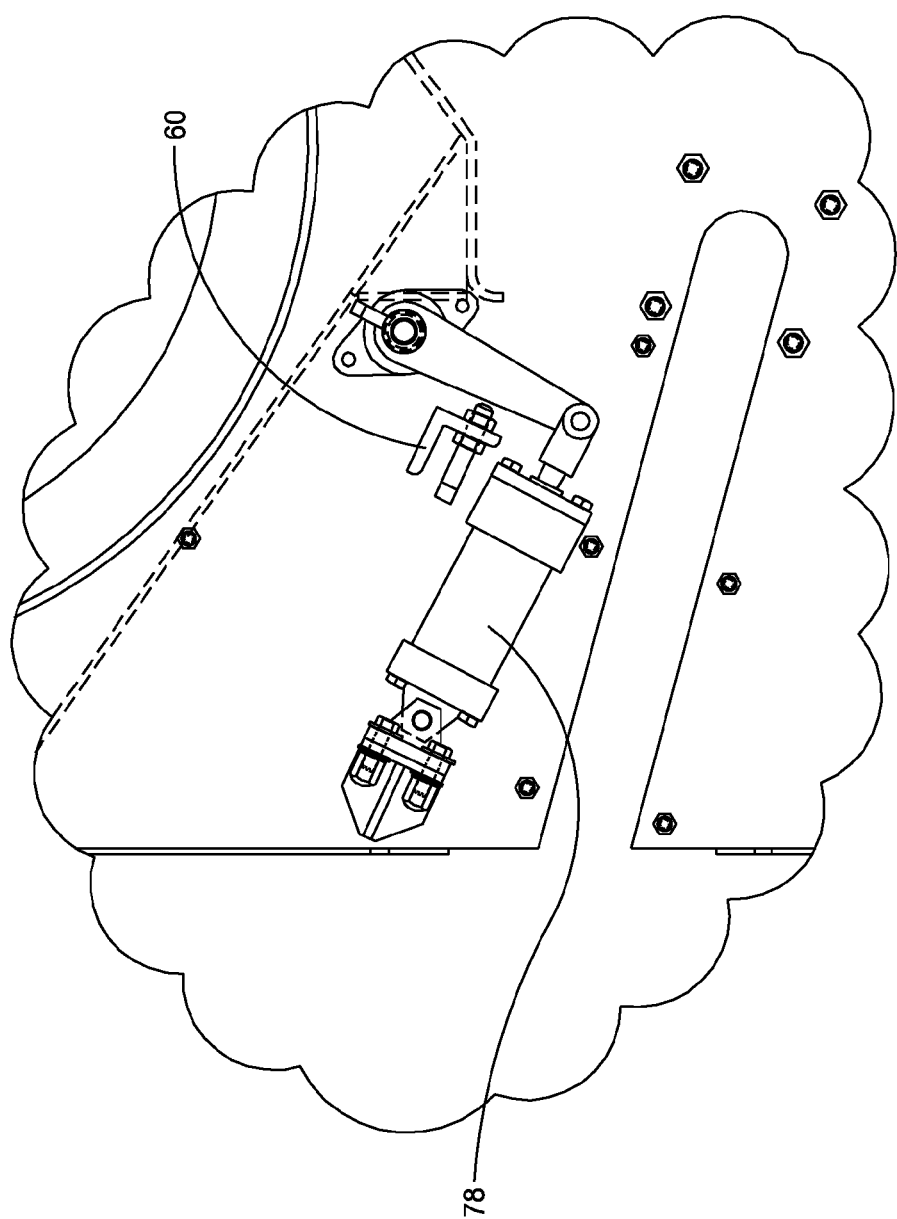
FIG. 7 is an enlarged detail view of an arm stop of the dynamic baffle system.

In one embodiment, the shaft 56 is configured to rotate the baffle plate 54 between the open and closed positions by a motor 58, which may be the same motor used to rotate the rotary screen drum 14 and the magnetic drum 24. Specifically, and with reference to FIGS. 2-4, the shaft extends through a bearing adaptor plate 74 provided in the frame 12 at each end of the shaft (FIG. 4). Each bearing adaptor plate 74 is connected to a drive arm 76, which in turn is connected to a cylinder 78. When operating the motor 58, the cylinder 78 and the drive arm 76 rotate the shaft 56 to move the baffle plate 54. To limit the movement of the baffle plate 54 when opening the baffle 52, the dynamic baffle system 40 further includes a stop 60 secured to the frame 12 of the magnetic separator 10. As shown in FIG. 8, the stop 60 is configured to limit the motion of the baffle plate 54 when moving to its open position. In one embodiment, a pneumatic cylinder may be used to actuate the dynamic baffle. The rotary motion of the baffle 52 may alternatively be provided by a small hydraulic cylinder, a screw jack actuator, or some other similar device.

In one embodiment, the dynamic baffle system 40 further includes a sensor 62 configured to detect the presence of media within the containment barrier structure 42. As discussed above, media mixture delivered to the containment barrier structure 42 builds up when the baffle 52 is in the closed position. The sensor 62 is secured to the frame 12 (sometimes referred to as a casing) of the magnetic separator 10 and capable of detecting the presence of media mixture within the containment barrier structure 42. In a certain embodiment, the sensor 62 is a capacitive proximity switch. Other sensors may also be used and fall within the scope of the present disclosure provided the sensor is capable of detecting the presence or buildup of media mixture within the containment barrier structure 42. Referring back to FIG. 2, the sensor 62 is secured to the mounting bracket 36, which is provided on the access cover 32. The containment barrier structure 42 forms a bottom of a rotary screen chamber.

Figure 9:
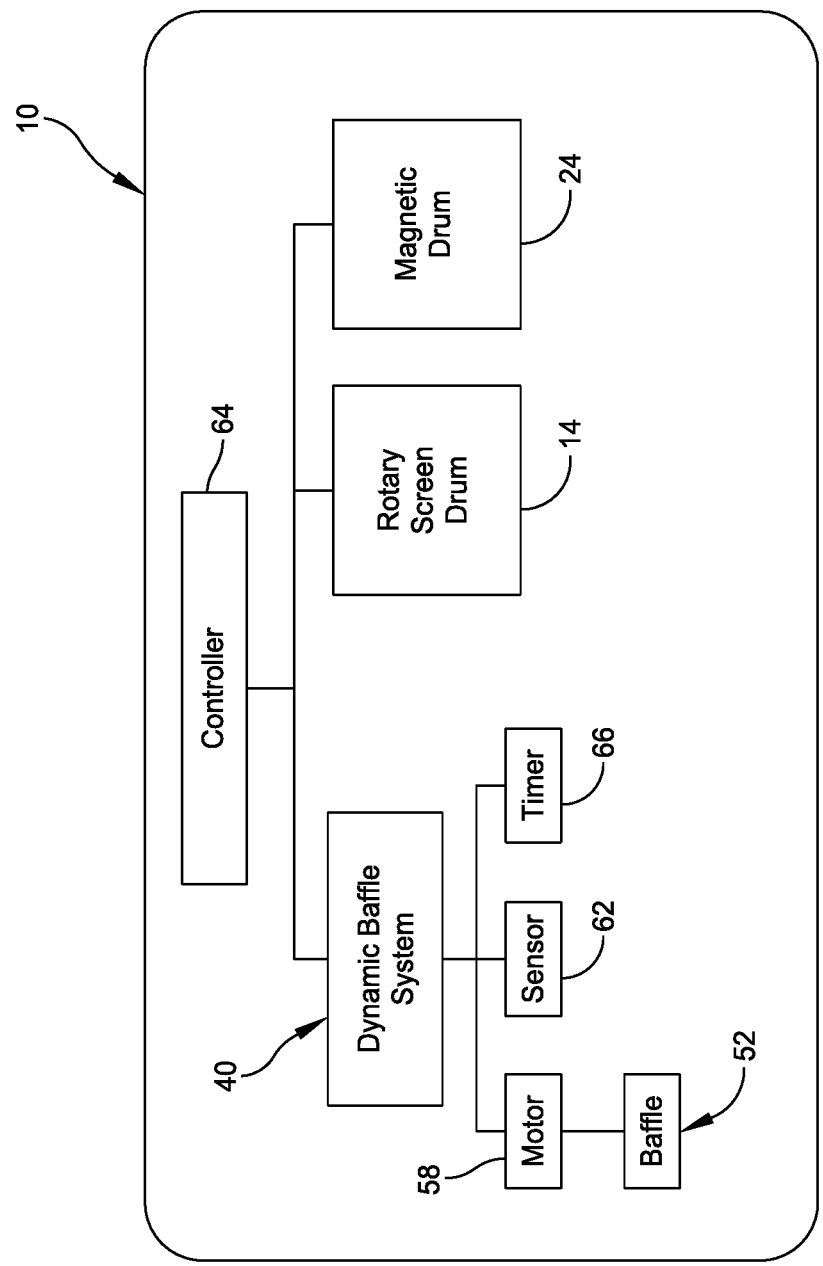
FIG. 9 is a schematic view of a control system of the magnetic separator.

When a sufficient amount of media mixture is deposited within the containment barrier structure 42, the dynamic baffle system 40 opens the baffle 52 to enable material to enter over the magnetic drum 24. To automate this process, the magnetic separator includes a controller 64 that is configured to control the operation of the magnetic separator 10. The controller 64 is further coupled to the sensor 62 and the baffle 52 to control the amount of media mixture flowing from the rotary screen drum 14 to the magnetic drum 24 through the containment barrier structure 42. The controller 64 is configured to control the movement of the baffle 52 to the open position when the containment barrier structure 42 is completely full with media mixture, and to control the movement of the baffle 52 to the closed position when media mixture contained within the containment barrier structure retreats from an exit end of the magnetic separator 10 to enable the outer flighting 22 of the rotary screen drum 14 to push the media mixture to the exit end of the magnetic separator 10 thereby resulting in a full distribution of media mixture across a face of the magnetic drum 24. In another embodiment, the dynamic baffle system further includes a timer 66 coupled to the controller 64 to mitigate responses near a set point to avoid chattering of the baffle 52. FIG. 9 is a schematic view of the magnetic separator having the dynamic baffle system 40 operating under the control of the controller 64. The drives of the rotary screen drum 14 and the magnetic drum 24 are independent from each other and may be under the control of common or separate controllers and sensors.

In another embodiment, the magnetic separator 10 includes a burden plate 68 secured to the frame 12 and positioned adjacent the opening 50 and configured to guide media mixture around the magnetic drum 24. As shown, the burden plate 68 is secured to the frame 12 of the magnetic separator 10 by a bracket 70. The burden plate 68 is positioned closely to the magnetic drum 24 so that magnetic material engages the magnetic drum during operation.

In certain embodiments, a sliding baffle plate 80 may be further provided. The sliding baffle 80 is adjusted up or down to meter the media mixture out of the bottom of the baffle 52 evenly. The sliding baffle 80 assists in spreading the media mixture evenly by only allowing a certain amount of media mixture to flow out of the rotary screen chamber, thus acting as a dam that causes the abrasive to build up within the rotary screen chamber. This construction enables the outer band of the flighting 22 on the rotary screen to push the media mixture toward the exit end of the magnetic separator. The sliding baffle 80 ensures that the media mixture is delivered across the width of the magnetic separator thus preventing the media mixture from falling out at an entrance end, overloading the entrance end while leaving the exit end of the separator empty. The baffle system 52 of embodiments of the present disclosure evens out the media mixture when the media mixture is presented to the separator in an intermittent loading. The sliding baffle 80 is incapable of accommodating such intermittent loading.

A method of controlling the flow of abrasive/sand media mixture within a magnetic separator 10 comprises: transferring media mixture 72 (FIG. 8) from the rotary screen drum 14 to the containment barrier structure 42 positioned below the rotary screen drum; sensing the presence of media mixture within the containment barrier structure; and controlling the movement of the baffle 52 between the open position in which media mixture is capable of flowing through the opening 50 from the containment barrier structure to the magnetic drum 24 and the closed position in which the media mixture is prohibited from flowing from the containment barrier structure to the magnetic drum. In one embodiment, the step of controlling the movement of the baffle 52 further includes controlling the movement of the baffle to the open position when the containment barrier structure 42 is completely full with media mixture 72, and controlling the movement of the baffle to the closed position when media mixture contained within the containment barrier structure retreats from an exit end of the magnetic separator 24 to enable an outer flighting 22 of the rotary screen drum 14 to push the media mixture to the exit end of the magnetic separator 10 thereby resulting in a full distribution of abrasive across a face of the magnetic drum.

While most prior art devices principally consist of a scalping section prior to the magnetic separator that diverts abrasive loading above a preset level back to the bottom of an elevator, thus recycling the overload through the elevator, the system of the present embodiment is relatively simple, and can provide a gross adjustment to alleviate overload conditions.

The main advantages of the dynamic baffle system described herein this magnetic separation process include (1) increased effectiveness of a shot blast operation, (2) reduced blast cycle times, (3) increased life of replacement wear parts, (4) reduced equipment maintenance costs, and (5) reduced overall abrasive consumption.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A dynamic baffle system for a magnetic separator including a frame, a rotary screen drum secured to the frame and configured to receive abrasive/sand media mixture, and a magnetic drum secured to the frame and positioned below the rotary screen drum, the dynamic baffle system comprising:
   at least one containment barrier secured to the frame and positioned between the rotary screen drum and the magnetic drum, the at least one containment barrier having an opening formed therein;
   a baffle configured to block the opening of the at least one containment barrier, the baffle being movable between an open position in which media mixture is capable of flowing from the at least one containment barrier to the magnetic drum and a closed position in which the media mixture is prohibited from flowing from the at least one containment barrier to the magnetic drum and configured to evenly build up on the at least one containment barrier;
   a sensor configured to detect a presence of media within the at least one containment barrier; and
   means for controlling an amount of media mixture flowing from the rotary screen drum to the magnetic drum via the at least one containment barrier.

2. The dynamic baffle system of claim 1, wherein the at least one containment barrier includes a first sloping wall positioned on one side of the rotary screen drum and a second sloping wall positioned on an opposite side of the rotary screen drum.

3. The dynamic baffle system of claim 2, wherein the at least one containment barrier further includes a horizontal wall extending from one of the first sloping wall and the second sloping wall, the opening being defined between the horizontal wall and the other of the first sloping wall and the second sloping wall.

4. The dynamic baffle system of claim 3, further comprising a shaft configured to rotate the baffle between the open and closed positions.

5. The dynamic baffle system of claim 4, further comprising a stop secured to the frame and configured to limit a motion of the baffle when moving to the open position.

6. The dynamic baffle system of claim 3, further comprising a burden plate secured to the frame and positioned adjacent the opening and configured to guide media mixture around the magnetic drum.

7. The dynamic baffle system of claim 1, wherein the sensor includes one of a capacitive proximity switch, a differential air pressure sensor, and a vibrating type sensor.

8. The dynamic baffle system of claim 1, wherein the means for controlling the amount of media mixture flowing from the rotary screen drum to the magnetic drum includes a controller.

9. The dynamic baffle system of claim 8, wherein the controller is configured to control a movement of the baffle to the open position when the at least one containment barrier is completely full with media mixture, and to control a movement of the baffle to the closed position when media mixture contained within the at least one containment barrier retreats from an exit end of the magnetic separator to enable an outer flighting of the rotary screen drum to push the media mixture to the exit end of the magnetic separator thereby resulting in a full distribution of abrasive across a face of the magnetic drum.

10. The dynamic baffle system of claim 8, further comprising a timer coupled to the controller to mitigate responses near a set point to avoid chattering of the baffle.

11. A magnetic separator comprising:
a frame;
a rotary screen drum secured to the frame and configured to receive abrasive/sand media mixture;
a magnetic drum secured to the frame and positioned below the rotary screen drum;
at least one containment barrier secured to the frame and positioned between the rotary screen drum and the magnetic drum, the at least one containment barrier having an opening formed therein; and
a dynamic baffle system including
a baffle configured to block the opening of the at least one containment barrier, the baffle being movable between an open position in which media mixture is capable of flowing from the at least one containment barrier to the magnetic drum and a closed position in which the media mixture is prohibited from flowing from the at least one containment barrier to the magnetic drum and configured to evenly build up on the at least one containment barrier,
a sensor configured to detect a presence of media with the at least one containment barrier, and
means for controlling an amount of media mixture flowing from the rotary screen drum to the magnetic drum via the at least one containment barrier.

12. The magnetic separator of claim 11, wherein the at least one containment barrier includes a first sloping wall positioned on one side of the rotary screen drum and a second sloping wall positioned on an opposite side of the rotary screen drum.

13. The magnetic separator of claim 12, wherein the at least one containment barrier further includes a horizontal wall extending from one of the first sloping wall and the second sloping wall, the opening being defined between the horizontal wall and the other of the first sloping wall and the second sloping wall.

14. The magnetic separator of claim 13, wherein the dynamic baffle system further includes a shaft configured to rotate the baffle between the open and closed positions.

15. The magnetic separator of claim 14, wherein the dynamic baffle system further includes a stop secured to the frame and configured to limit a motion of the baffle when moving to the open position.

16. The magnetic separator of claim 13, further comprising a burden plate secured to the frame and positioned adjacent the opening and configured to guide media mixture around the magnetic drum.

17. The magnetic separator of claim 11, wherein the sensor includes one of a capacitive proximity switch, a differential air pressure sensor, and a vibrating type sensor.

18. The magnetic separator of claim 11, wherein the means for controlling the amount of media mixture flowing from the rotary screen drum to the magnetic drum includes a controller.

19. The magnetic separator of claim 18, wherein the controller is configured to control a movement of the baffle to the open position when the at least one containment barrier is completely full with media mixture, and to control a movement of the baffle to the closed position when media mixture contained within the at least one containment barrier retreats from an exit end of the magnetic separator to enable an outer flighting of the rotary screen drum to push the media mixture to the exit end of the magnetic separator thereby resulting in a full distribution of abrasive across a face of the magnetic drum.

20. The magnetic separator of claim 18, wherein the dynamic baffle system further includes a timer coupled to the controller to mitigate responses near a set point to avoid chattering of the baffle.

* * * * *